United States Patent [19]

Saumsiegle

[11] 4,147,748

[45] Apr. 3, 1979

[54] DISPLACEMENT BLOW-MOLDING

[76] Inventor: Robert W. Saumsiegle, 27 Priscilla Rd., Wellesley, Mass. 02181

[21] Appl. No.: 708,145

[22] Filed: Jul. 23, 1976

[51] Int. Cl.$^2$ ........................................... B29C 17/07
[52] U.S. Cl. .................................. 264/523; 264/294; 264/328; 425/528; 425/533; 264/537
[58] Field of Search ...................... 264/89, 94, 97, 294, 264/323, 325, 328; 425/324 B, 256, 447, DIG. 32, DIG. 203, 528, 533

[56] References Cited

U.S. PATENT DOCUMENTS

| | | | |
|---|---|---|---|
| 1,945,255 | 1/1934 | Camagni | 425/DIG. 32 |
| 2,313,110 | 3/1943 | Wertz | 264/36 |
| 2,981,976 | 5/1961 | Maier | 425/356 X |
| 3,166,025 | 1/1965 | Hulse | 425/447 X |
| 3,337,910 | 8/1967 | West | 264/94 X |
| 3,375,553 | 4/1968 | Criss | 264/97 X |
| 3,670,066 | 6/1972 | Valyi | 264/328 X |

Primary Examiner—Jan H. Silbaugh
Attorney, Agent, or Firm—M. Richard Page

[57] ABSTRACT

Apparatus and method for forming hollow articles from plasticized materials are disclosed. A preform is partially formed under substantially no pressure on a preform core by introducing the core into a void-free charge of plasticized material that is placed in a preform cavity from a source of the plasticized material. After the preform core and preform cavity have moved together to define a preform mold space, the charge of plasticized material is subjected to a pressure forming step to form a completely packed preform on the core. The preform is then blow-molded in a blow cavity by introducing blowing gas into the preform through the preform core. Neck mold structure that strips and releases the formed article from the core is also disclosed.

4 Claims, 22 Drawing Figures

DISPLACEMENT BLOW-MOLDING

BACKGROUND OF THE INVENTION

1. Field of the Invention

This invention relates to apparatus and methods for forming hollow articles of hardenable plasticized materials, and particularly to apparatus and techniques for forming such articles by blow-molding.

2. Discussion of Reported Developments

The production of hollow articles such as containers, by the blow molding of plasticized materials is an art that has been practiced for many years; glass is a material that has been successfully blow-molded on a commercial scale. In apparatus that has been used for forming glass containers, a gob of molten glass is placed in a parison mold and a plunger is pressed into the glass to form a parison that is supported in a neck mold. Then the neck ring, with the parison attached, is transfered to a blow molding cavity, where a blowing head inflates the parison into the shape of a finished container.

After the advent of synthetic thermoplastic polyhydrocarbon materials, came efforts to produce hollow containers from such materials. In one of the earliest commercial efforts, extrusion blow molding, which began in the 1930's, a tubular parison is extruded and thereafter the softened parison is placed in an opened split blow mold that, when closed, clamps both ends of the tube together. Various means are utilized to inflate the tube while it is inside the blow mold, to form a finished object. This method has several drawbacks, a primary one being that the amount of material consumed, for each container made, is relatively high because the portions of plastic material that are pinched off from each end of the tube by the blow mold are lost. These portions are either discarded or are reground and remelted for subsequent reuse. These factors have an adverse impact on materials and processing costs. Materials costs are an especially important factor now because rapidly rising petroleum prices have forced up the costs of the thermoplastic resins that are commonly used in container production.

A second commercially-practiced process for making hollow plastic articles is injection blow-molding. In this process, a preform is formed on a preform core by injecting plasticized material under high pressure into an injection cavity in which the core has been placed. Such systems avoid the loss of the pinched-off portions of material that are inherent in the extrusion blow molding process, provide better control of article weight, and yield a better neck finish on the article, but in turn have other drawbacks.

First, the machines for carrying out this process are costly. The basic injection press must be capable of developing at least several tons of pressure and such presses are expensive to make. Also, the cost of tooling (i.e., cores, blow cavities, neck rings, etc.) for these machines is high, because it must be made to very close tolerances so that the formation of flash on the parison is avoided. Flashing occurs when the resin, which is injected under high pressure, is forced between mating parts of the tooling and is undesirable because it is carried over to the finished container, with the result that the container is either discarded or must undergo additional processing to remove the flash; the amount of material used to form each container is also unnecessarily increased. Such tooling can easily be rendered useless by slight damage to the tools resulting from accidents or mishandling.

In addition, to provide a small cross section of material that is easily severed after the injection step, the plasticized material is injected through a very small gate or opening in the injection cavity. In order to obtain a sufficient flow of resin through the gate, the resin must be heated to a point at which the viscosity is relatively low and it must be subjected to high pressure, usually on the order of 15,000 to 20,000 psi or higher. When injection molding relatively stiff resins such as high nitrile barrier resins (the materials that are currently considered in the forefront with respect to containers for pressurized fluids, for example, carbonated beverages), injection pressures in the range of 25,000 psi are used. These high pressures cause the resin to flow through the gate at high velocity and this generates additional heat that raises the temperature of the resin above its melt temperature. This can cause deterioration of thermo-sensitive resins and results in visual blemishes, such as local opacity or discoloration, or mechanical blemishes, such as locally reduced wall thickness or voids, in the finished product. The rise in the temperature of the resin also increases machine cycle time because additional time is necessary to reduce the temperature of the preform to an optimum blow molding temperature. Another undesirable result of the use of high injection pressures is that it induces an uneven stress distribution in the preform, especially in the part of the preform near the gate, this leads to difficulties in inflating the preform evenly and also to weakened portions in the finished article.

Injection blow molding also has limitations with respect to the maximum size of container that can be economically produced. Machine cycle time is lengthened because the relatively larger volume of resin necessary to form the larger preform must be injected through the very narrow gate into the injection cavity. Moreover, injection presses capable of developing sufficient injection pressure over the relatively larger area involved are very costly.

Thermo-forming is another container production process that has been used commercially. In the more conventional thermo-forming apparatii that have been used, a sheet or web of thermoplastic material is drawn across the mouth of an article-forming cavity. A plunger forces the thermoplastic material into the cavity, sometimes aided by a vacuum drawn in the cavity or by blowing air introduced through the plunger. This process has serious drawbacks from the standpoint of material utilization, because a major portion of the web from which the article is drawn is not used and is discarded as scrap.

U.S. Pat. No. 3,602,946 discloses an improved thermo-forming technique in which a pad of thermoplastic material from which the article is to be formed is molded under low pressure, the periphery of the pad being received in a transfer ring. A thin-walled article is formed from the pad of thermoplastic material by a plunger that forces the material into a forming cavity. Even by this process, however, a significant portion of the pad of thermo-plastic material remains adhered to the transfer ring after the article is formed, and this material represents waste that is not used in the formation of the article.

Efforts have been made to mold preforms using low pressure molding techniques. In one type of equipment, a ram is used to introduce a quantity of plasticized material, through a relatively large opening, into a preform cavity that contains a preform core. Examples of this arrangement are illustrated in U.S. Pat. No. 3,172,929 to Santelli and U.S. Pat. No. 3,170,871 to Ninneman et al. It should be noted that in these arrangements, the ram forms a portion of the bottom wall of the preform cavity; if the volume of the charges of plasticized material is not very closely controlled, preforms having differing bottom wall thicknesses, and thus differing blowing characteristics, are produced on each cycle, with a resulting non-uniformity of the finished articles.

Other attempts have involved compression molding the preform by pressing a preform core into a charge of plasticized material placed in a preform cavity. See U.S. Pat. No. 3,337,910 to West and U.S. Pat. No. 3,375,533 to Criss. It is believed to be very difficult to produce fully packed preforms having uniform blow molding characteristics by these means. If attempts are made to make the volume of the charge equal to the volume of the preform mold space, on a statistical basis, some of the charges will be of lower volume and an incomplete preform will result. If the cavity is overcharged by a volume of material greater than that of the mold space, then the incidence of flashing or uneven wall thickness of the preform is likely to increase.

SUMMARY OF THE INVENTION

In accordance with the invention, a charge of plasticized material is placed in a preform cavity member. By relative movement together of the preform cavity member and the preform core, the preform core is introduced into the preform cavity, resulting in formation of an unpacked preform. Camming surfaces associated with the preform cavity can be used to close neck rings surrounding the base of the preform core. After the preform cavity, preform core and neck ring segments have been brought together to define a preform mold space, a quantity of plasticized material is urged under pressure into the preform mold space to form a completely packed preform. The preform is thereafter blow-molded into the shape of the desired finished article.

A symmetrical, void-free charge of plasticized material in the preform cavity is assured by first placing the source of plasticized material near the bottom of the preform cavity and then progressively feeding the charge of plasticized material into the preform cavity as relative separation of the preform cavity and the source of plasticized material is effected.

The neck mold actuating mechanism of the neck mold associated with a preform core strips the finished article from the core by first moving the closed neck mold longitudinally with respect to the core. Thereafter, the actuating mechanism causes the neck mold segments to move laterally outwardly from the longitudinal axis of the core to release the neck of the finished article.

DESCRIPTION OF THE PREFERRED EMBODIMENT

DESCRIPTION OF THE APPARATUS SHOWN IN FIGS. 1-8

Figure 1:
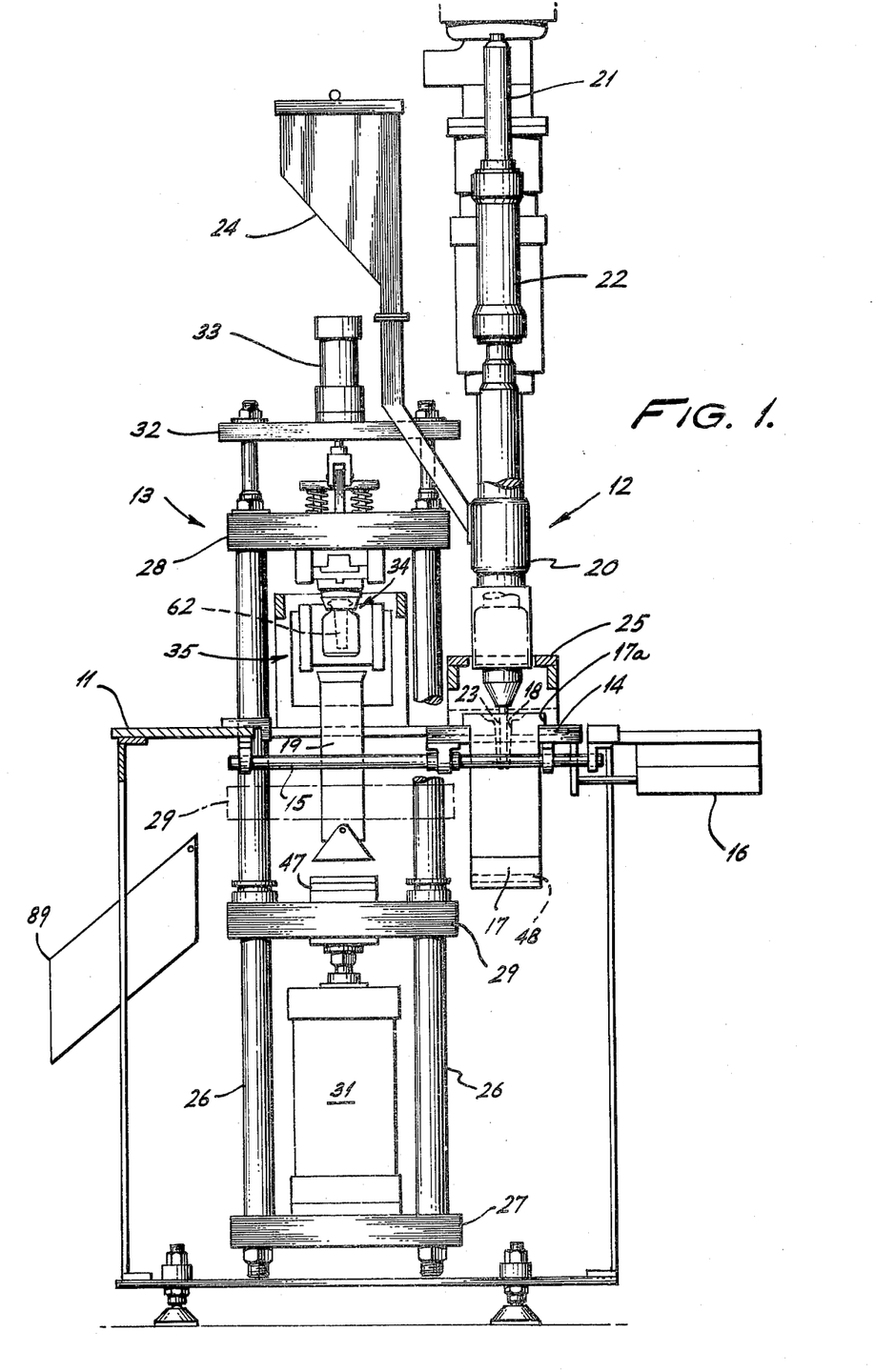
FIG. 1 is a front elevational view of one embodiment of apparatus in accordance with the invention, having a single forming station.

In accordance with the embodiment shown in FIG. 1, the apparatus includes a source of plasticized material 12, for example, a maxalating screw plasticizer, that is mounted on base 11 and that defines a charging station. Also mounted on the base 11 is a forming unit 13 at which preforms and finished articles are formed.

Figure 2:
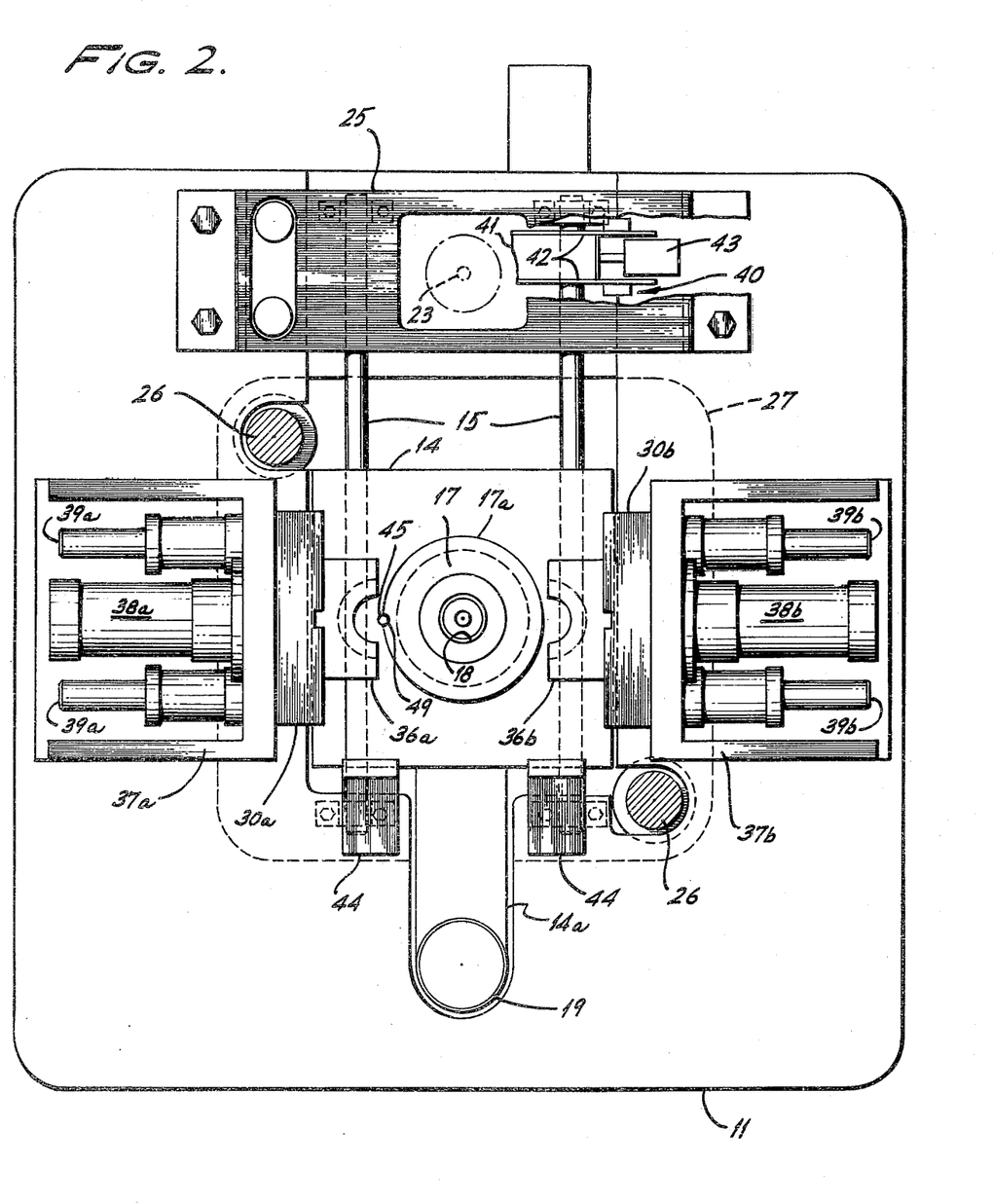
FIG. 2 is a partial plan view of the apparatus illustrated in FIG. 1.

Referring to FIGS. 1 and 2, a shuttle 14 is slideably mounted on a pair of guides 15 that are mounted on the base. The shuttle 14 is moved laterally between the charging station and the forming station by suitable means, such as an hydraulic cylinder 16. In FIG. 1, the shuttle is shown positioned at the charging station and in FIG. 2 the shuttle is shown positioned at the forming station.

The shuttle 14 has a generally centrally disposed aperture in which is freely disposed a preform cavity block 17. The cavity block includes preform cavity 18 that defines, in part, the exterior shape of the preform. As mentioned, the cavity block 17 is freely received in the shuttle 14 and is retained on the shuttle by a peripheral flange 17a. Shuttle 14 also has affixed thereto a receiving tube 19. It should be noted, as shown in FIG. 1, that when the preform cavity 18 is positioned at the charging station, the receiving tube 19 is positioned at the article forming station.

Figure 3:
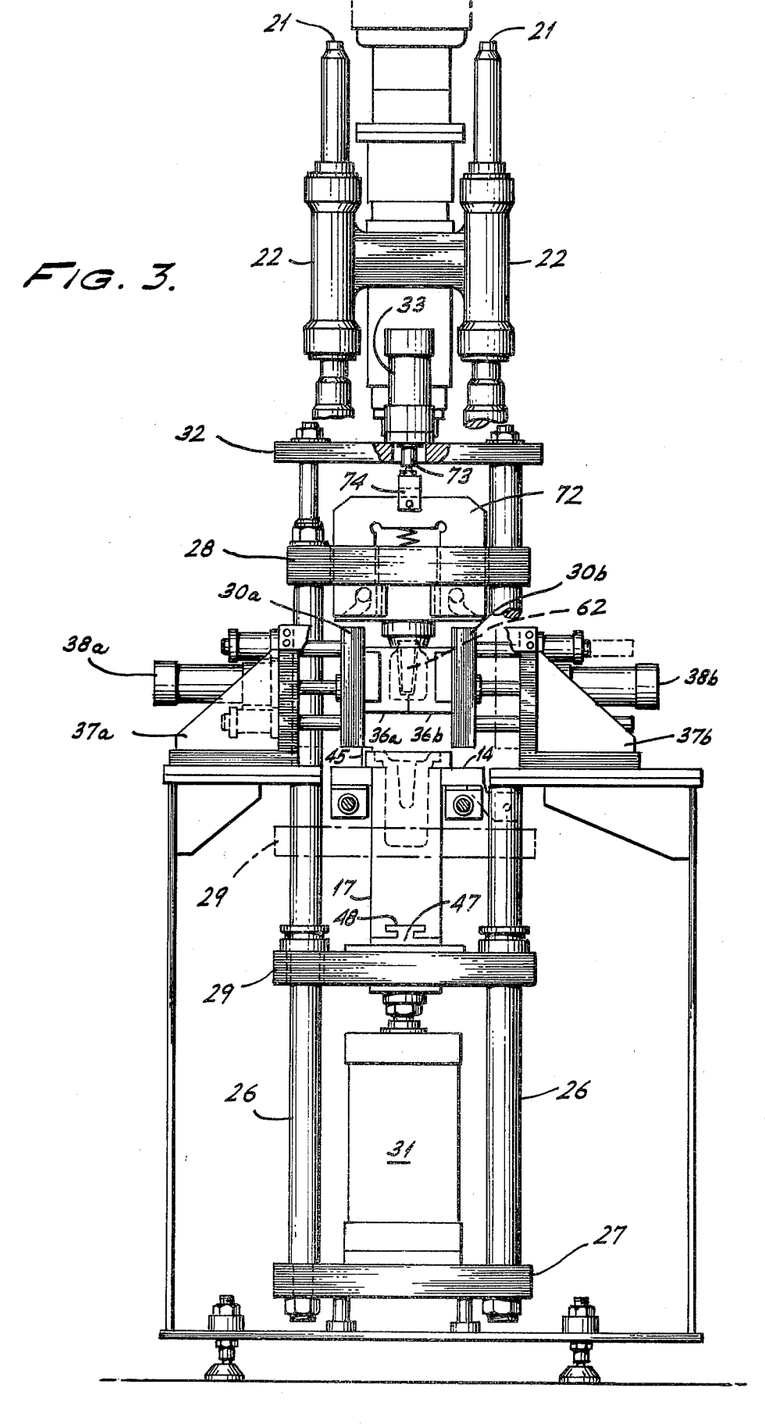
FIG. 3 is an end view of the apparatus shown in FIG. 1, taken from the end adjacent the forming station.

With reference to FIGS. 1, 2 and 3, the plasticizer 20 is mounted for vertical movement with respect to the base 11. The mounting arrangement for the plasticizer 20 includes the base 25 secured on the base 11 and a pair of upstanding guide bars 21 that are mounted on the base 25. The plasticizer 20 is mounted to move vertically on the guide bars 21 by hydraulic motor units, 22 that are slideably mounted on the guide bars 21. An hydraulic control circuit for effecting movement of the plasticizer 20 along the guide bars 21 will be discussed below in connection with FIG. 7.

The plasticizer 20 moves vertically to position the nozzle 23 a short distance from the bottom of the preform cavity 18 and to withdraw the nozzle 23 from the cavity 18. Alternatively, the plasticizer could be held in fixed position and the preform cavity block moved relative to the fixed nozzle to accomplish filling of the cavity in the manner hereinafter more fully explained. Means similar to those disclosed herein for moving the plasticizer could be employed for moving the preform cavity block vertically at the charging station.

The plasticizer 20 includes a feed hopper 24 for feeding resin in particulate form to the plasticizer.

Again referring to FIGS. 1, 2 and 3, the forming unit 13 includes a press comprised of vertical tie bars 26 that extend between a lower fixed platen 27 and an upper fixed platen 28. A moveable platen 29 is slideably mounted for movement in vertical directions on the tie bars 26. An hydraulic cylinder 31 is utilized to move the platen 29 vertically along the tie bars 26.

As shown in FIG. 1, a mounting plate 32 is mounted above the upper fixed platen 28 and carries an hydraulic cylinder 33, the function of which will later be described in connection with the description of FIGS. 5A and 5B.

Depending from the bottom of upper fixed platen 28 is a neck ring and core assembly 34 which is also discussed further below. It should be noted that in order to give a full view of the assembly 34 in FIG. 1, the figure does not include one of the blow molding cavity parts and its mounting structure.

Referring to FIGS. 2 and 3, blow splits 36a, 36b are readily removably mounted on plates 30a and 30b respectively. The plates 30a and 30b are mounted for transverse sliding movement with respect to mounting bases 37a, 37b respectively by suitable means, for example, slideable guides 39a, 39b that are received in slide bearings mounted on the bases 37a, 37b. The plates 30a, 30b are moved toward and away from core 62 by suitable means, such as hydraulic cylinders 38a, 38b respectively. As shown in FIG. 3, the blow splits 36a, 36b are closed about core 62 to form a blow molding cavity in which an article, such as a container, is formed.

With certain types of resins, particularly those having a relatively high viscosity at melt temperatures, as the nozzle 23 is withdrawn from the preform cavity 18, a string of plastic material follows the nozzle as it is withdrawn from the charge of plasticized material deposited in the cavity 18. It is desireable to sever this string, and one means of doing so is illustrated by the severing unit 40 shown in FIG. 2. The unit 40 includes a heated element 41, for example, a nichrome wire that is connected to a source of electrical current (not shown) that heats the wire 41. The wire 41 extends between opposed arms 42. The wire 41 is caused to sweep beneath the nozzle 23 by a suitable means, such as a solenoid 43 that is drivingly engaged with the arms 42.

As previously mentioned, the cavity block 17 is freely received in the shuttle 14. In this manner, the cavity block 17 can be driven vertically upwardly out of the shuttle 14. This latter-mentioned operation is carried out when the shuttle 14 is positioned against the stops 44 (FIG. 2), i.e., when the preform cavity 18 is positioned with its longitudinal axis in vertical alignment whith the longitudinal axis of the core and neck mold unit 34. The vertically moveable platen 29 carries on its upper face a locking block 47. The locking block 47 has a cross-sectional peripheral configuration that is compatible with a locking recess 48 in the base of the cavity block 17. Thus, as the cavity block 17 is carried by the shuttle 14 over the platen 29, the locking block 47 is received in the recess 48 and the cavity block is firmly coupled to the sliding platen 29. When the foregoing has been accomplished, the hydraulic cylinder 31 is caused to first move vertically upwardly to drive the cavity block 17 and thus preform cavity 18 toward the core and neck ring unit 34; likewise, the hydraulic cylinder 31 can be caused to move the platen 29 downwardly, thereby withdrawing the cavity block 17 and causing it to be once again supported in the shuttle 14.

Referring to FIG. 2, it should be noted that means are provided for locating the cavity block 17 with respect to the shuttle 14. In the preferred embodiment, such location is accomplished by means of a locating pin 45 upstanding from the shuttle 14 and a complementary recess 49 in the flange 17a of the cavity block 17. Thus, when the cavity block 17 is drawn downwardly onto the shuttle 14, the position of the cavity 17 is located by the pin 45, which prevents rotation of the cavity block 17 in the shuttle 14.

Figures 4, 6:
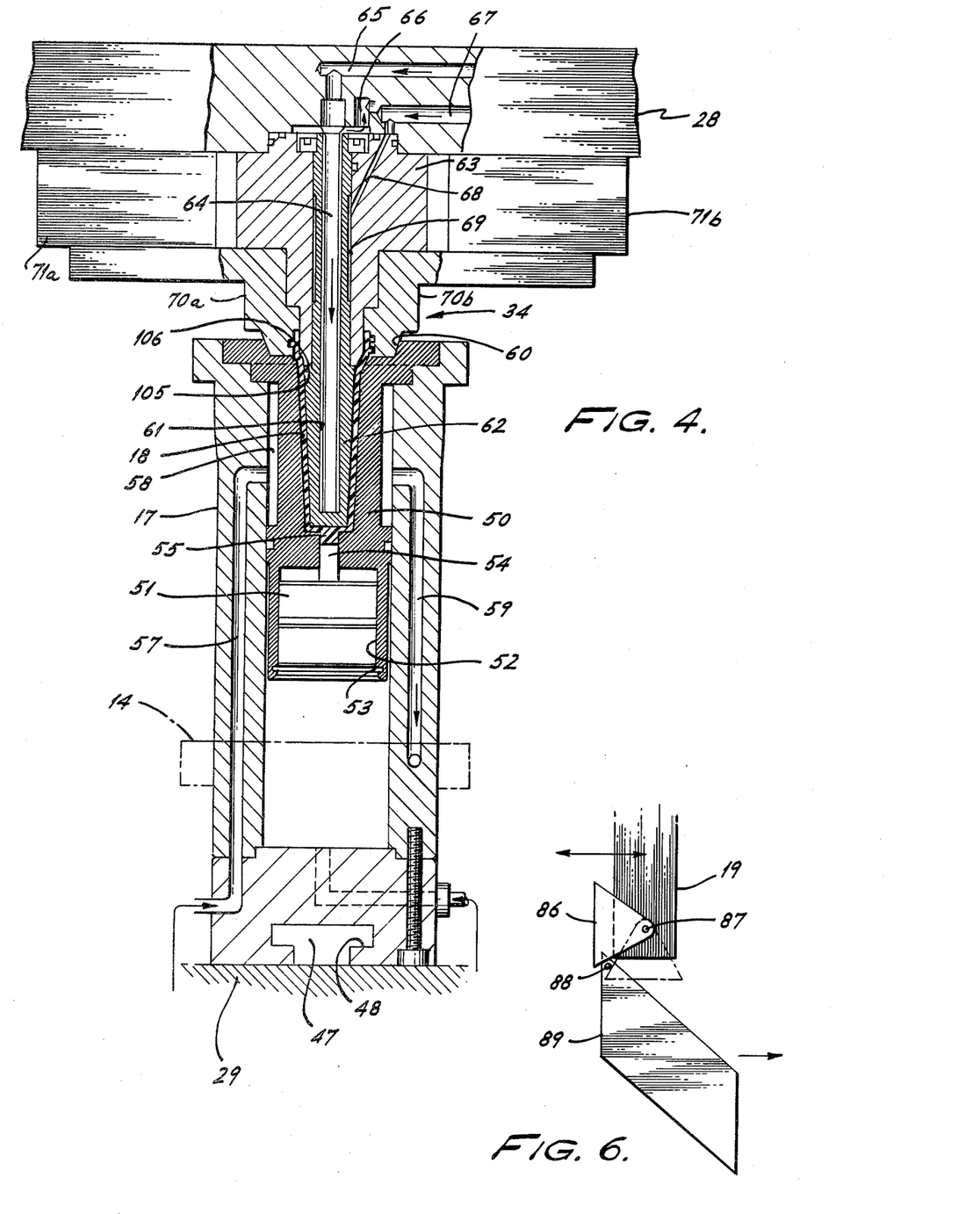
FIG. 4 is a sectional view of a preform cavity block, with a preform core received in the preform cavity.
FIG. 6 is a schematic view of article discharge apparatus.

FIG. 4 is a cross-sectional view showing a core and neck ring assembly 34, with the core positioned in the preform cavity 18. In FIG. 4, the preform cavity block 17 has been driven upwardly from the shuttle 14 so that the core 62 is received in the preform cavity 18. The preform cavity block 17 has removeably secured therein a preform cavity member 50 in which is formed the preform cavity 18. The cavity member 50 has a bore 52 formed in the lower portion thereof. In the bore 52 is slideably mounted a piston 51 that is retained in the bore 52 by suitable means such as a snap ring 53. Piston 51 carries an extending portion 54 that is slideably received in and that conforms to the cross-sectional configuration of the recess 55 that communicates with the preform cavity 18.

The preform cavity block also includes an inlet conduit 56 for admitting a fluid under pressure, such as air, into the chamber in the cavity block 17 formed beneath the piston 51. Pressurized fluid introduced through conduit 56 bears against the piston 51 and forces it upwardly, thereby causing the extension 54 to move into the recess 55, for purposes to be later explained.

Cavity block 17 can also be provided with appropriate means for providing a heat exchange fluid to the preform cavity member 50. In the arrangement shown in FIG. 4, an inlet conduit 57 carries the heat exchange fluid to an annular chamber 58 formed between the preform cavity block 17 and the cavity member 50. The heat exchange fluid is exhausted from the chamber 58 by an outlet conduit 59. In this manner, plasticized material in the preform cavity 18 can be brought to and maintained at a desired temperature.

It should also be noted that in the top portion of the cavity member 50 there is formed a tapered surface 60, the function of which will hereinafter be discussed.

Referring again to FIG. 4, the core and neck ring assembly 34 includes a core member 62 mounted in a core mounting base 63. The core mounting base 63 is in turn removeably secured to the fixed upper platen 28. The core 62 is mounted for limited sliding movement relative to the mounting base 63 for purposes as will hereinafter be explained.

Preferably, means are provided for supplying a heat exchange fluid to the core. In the arrangement shown in FIG. 4, a centrally-disposed tube 64 is disposed within the hollow interior of the core 62. Heat exchange fluid is supplied to the tube 64 via an inlet conduit 65 that is in fluid communication with the tube 64. The fluid flows through the tube 64 and exits therefrom at the end adjacent the tip of core 62, and then travels upwardly in spaces 61 formed between the outside wall of the tube 64 and the inside surface of the core 62, to an exhaust conduit 66.

The upper fixed platen 28 also includes a conduit 67 for supplying blowing gas, usually air, under pressure to a conduit 68 in the core mounting base 63. The blowing gas flows from the conduit 68 through passageway 69 formed between the core 62 and the core mounting block 63. It should be realized that the blowing gas is supplied to the core when the core has been removed from the preform cavity 18 and is disposed in a blowing cavity. A blowing gap is provided between the shoulder 105 on the core 62 and the portion 106 of the mounting block 63. The blowing gas travels from the spaces 69 through channels (not shown) and exits through the blowing gap formed between the core and the core mounting block. In this manner, the preform is inflated against the interior walls of the blowing cavity.

Preferably, the core and neck ring assembly 34, the preform cavity member 50, and the blow splits 36a, 36b are all readily demountable from their respective mountings so that a changeover to different tooling is easily effected. In this manner, the apparatus can form a variety of shapes and sizes of finished articles.

Figures 5A, 5B, 7:
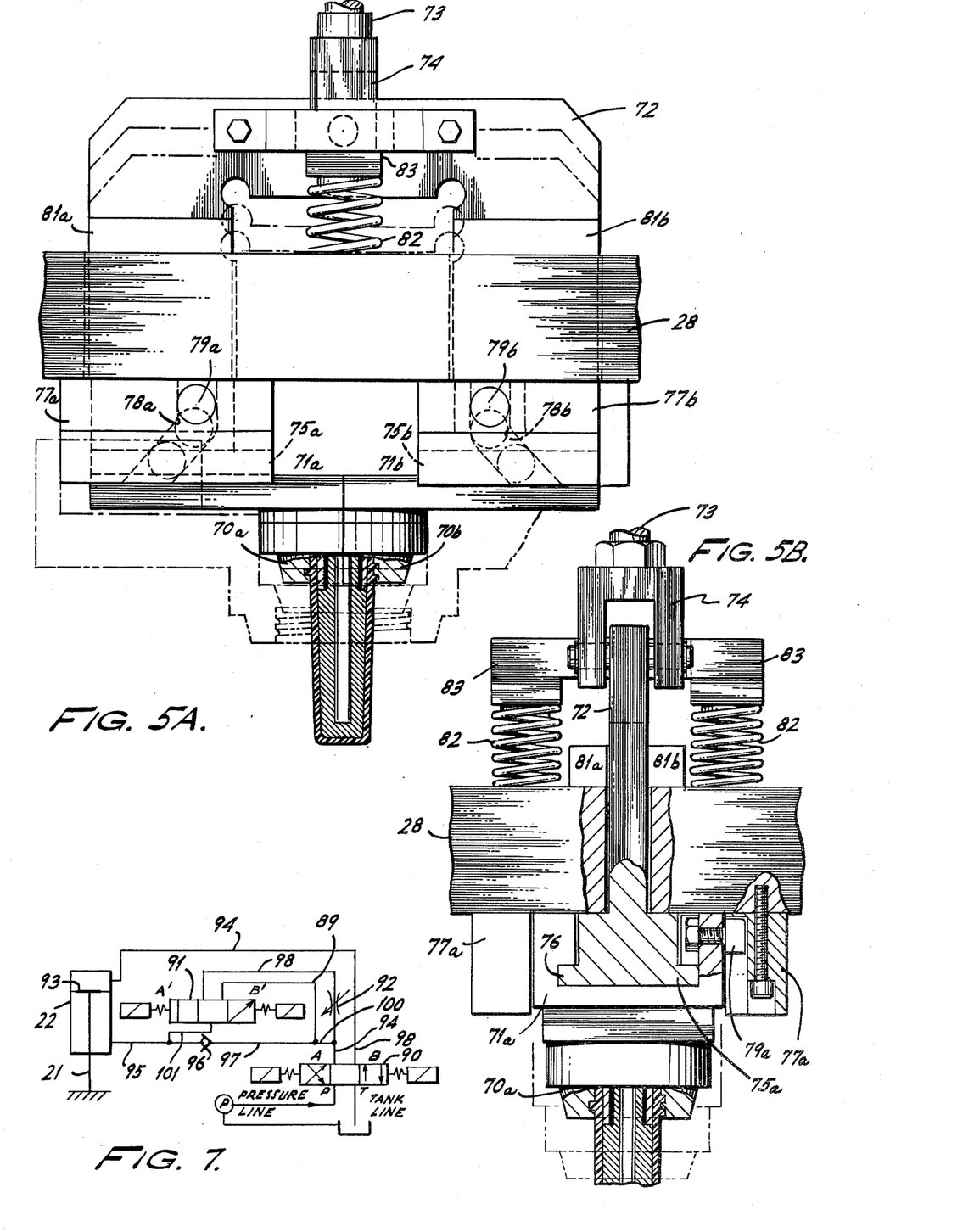
FIG. 5A is a front elevational view of a preform core and neck ring mechanism showing various positions of the parts.
FIG. 5B is an end view of the core and neck ring assembly shown in FIG. 5A.
FIG. 7 is a schematic diagram of a hydraulic control circuit for moving the plasticizer with respect to the preform cavity.

Referring to FIGS. 5A and 5B, there is shown a preferred mechanism for actuating the neck mold segments 70a, 70b. As previously mentioned, segments 70a, 70b are mounted on neck ring mounting blocks 71a, 71b, respectively. In turn, the neck ring mounting blocks 71a, 71b are slideably mounted on track mmebers 75a and 75b. The track members 75a, 75b include outwardly extending tracks 76 on which the neck ring mounting blocks 71a and 71b are slideably received.

The track members 75a and 75b are each affixed to one of the arms of a yoke member 72. The yoke member 72, as shown in FIG. 5A, is mounted for vertical movement with respect to the upper fixed platen 28. As shown in FIG. 5B, pairs of guide blocks 81a and 81b slideably receive the yoke member 72 in the gap between the guide blocks.

Means are provided for effecting transverse movement of the neck ring sections 70a, 70b toward and away from the longitudinal axis of core 62 and also for effecting movement of neck ring sections 70a, 70b in directions parallel to the longitudinal axis of the core 62. The embodiment illustrated in FIGS. 5A and 5B includes a camming means comprised of opposed pairs of camming blocks 77a and 77b that are mounted in depending relationship from fixed platen 28. Each of the camming blocks includes a cam track 78a, 78b, respectively. In each of the cam tracks, a cam follower 79a, 79b is received. The cam followers 79a, 79b are attached to the neck ring mounting blocks 71a, 71b, respectively. It should be noted that each of the cam tracks 78a, 78b includes a first portion that is substantially vertically disposed and a second portion that is angularly disposed with respect to the first portion and which diverges outwardly with respect to the longitudinal axis of the core 62.

The yoke 72 is connected to the hydraulic cylinder 33 (FIGS. 1 and 3) by a drive linkage comprised of rod 73 and clevis 74. Also, resilient driving elements, such as compression springs 82 extend between the tangs 83 mounted on yoke 72 and the top surface of fixed platen 28.

Referring to FIG. 5A, the operation of the neck ring actuating mechanism is explained. In the full line position of the yoke 72, the segments 70a, 70b and the cam followers 79a, 79b, the yoke 72 is in its uppermost position, as are the cam followers 79a, 79b, in their respective cam track 78a, 78b. In this position, the neck ring segments 70a, 70b are fully closed about the base of core 62 and define in conjunction therewith, a neck ring mold for forming the neck of an article. These various parts are preferably held in this position by an upward force on the yoke 72 developed by the hydraulic cylinder 33.

It should be noted that the foregoing describes the position of the various parts at the time the preform is being formed, as will later be described, and at the time that the preform is being blow molded into its final shape.

Subsequent to the formation of the container in the blow cavity, the sections of the blow cavity are separated and the finished container is then stripped from the core 62. This is accomplished by causing the hydraulic cylinder 33 to exert a downward force on the rod 73, and thus a downward force on the yoke 72. This causes the yoke 72 to move downwardly with respect to the fixed platen 28, thereby also causing track members 75a, 75b to move downwardly. This in turn causes neck ring mounting blocks 71a, 71b to move downwardly, as, it will be recalled, the blocks 71a, 71b are mounted on the track members 75a, 75b respectively.

It should be realized that as the neck ring mounting blocks 71a, 71b move downwardly with respect to the fixed platen 28, the cam followers 79a, 79b move in the cam tracks 78a, 78b respectively. During an initial portion of the travel of the yoke 72, the cam followers 79a, 79b move substantially vertically, and in parallel fashion, in the first portions of the cam track 78a, 78b. As a result of this, the neck ring segments 70a, 70b are moved longitudinally, with respect to the core 62, but do not separate laterally away from the longitudinal axis of the core. This results in stripping the neck of the container from the base portion of the core and freeing it for subsequent removal from the core. This stage of movement is shown in the intermediate single dotted phantom line position of FIGS. 5A and 5B.

As the yoke member 72 continues downwardly, the cam followers 79a, 79b enter the outwardly diverging portions of the cam tracks 78a, 78b and neck ring mounting blocks 71a, 71b and therefore, the neck ring segments 70a, 70b are caused to move both downwardly and laterally outwardly with respect to core 62, as shown by the double dotted phantom line position of FIGS. 5A and 5B. This action frees the neck of the container from the undercut portions of the neck rings 70a, 70b and the finished article is free to fall from the core 62.

In the embodiment of FIG. 1, the finished container falls into receiving tube 19 that includes (as shown in FIG. 6) a swingable bottom wall 86 that is pivotally mounted at the bottom end of tube 19 by suitable means, as for example, pivot pins 87. The bottom wall member 86 can be pivoted to the full line position shown in FIG. 6 by a suitable camming structure, such as pin 88 on chute 89. When this occurs, a finished container within receiving tube 19 is free to fall by gravity to the chute 89 mounted on base 11 (See FIG. 1) and from there into a suitable receiving device.

As the neck ring parts 70a, 70b are opened, as previously described, it should be realized that the compression springs 82 are compressed by the advancing yoke 72. After the finished article is free of the core 62, the hydraulic cylinder 33 is deactivated and the compression springs 82 are free to drive yoke 72 upwardly. The length of springs 82 is such that the yoke 72 is not returned to the full line position shown in FIG. 5A, but rather, the yoke 72 is driven to a point at which the neck ring parts 70a, 70b remain slightly open. In this condition, the neck ring parts 70a, 70b are positioned so that when the preform cavity block 17 is driven upwardly, as previously described, the tapered surface 60 of the cavity member 50 closes the neck ring segments about the core 62.

As previously mentioned, the plasticizer 20 is mounted for vertical movement with respect to base 11. A preferred hydraulic circuit for effecting vertical movment of the plasticizer 20 is schematically shown in FIG. 7. As previously noted, the plasticizer 20 is mounted on the base 11 by means of upstanding guide rods 21, on which are slideably received hydraulic cylinders 22. Each guide rod 21 includes, enclosed within a cylinder 22, a fixed piston member 93 that defines two fluid pressure chambers in each cylinder 22, an upper chamber above the piston 93 and a lower chamber below the piston 93.

For purposes of discussion of the hydraulic control circuit shown in FIG. 7, it will be assumed that the plasticizer 20 is at its upper vertical limit of travel and is about to move vertically downwardly to introduce the nozzle 23 into the preform cavity 18. The solenoid operated 3-position two-way valve 90 is energized so as to position valve section B between the pressure and tank lines P and T and the conduits 98 and 94 respectively. Hydraulic fluid under pressure supplied by pump P flows through section B of the valve 90 to conduit 94 and in turn, through conduit 100 to conduit 97, through check valve 96, through conduit 95, to the lower chamber of the cylinder 22. This causes the cylinder 22 to be driven downwardly on guide rod 21, thereby lowering the plasticizer 20. Appropriate limit switches are provided to stop downward movement of the plasticizer 20 when the tip of the nozzle 23 is spaced a small distance from the bottom of the preform cavity. It should be noted that during this time, the full line pressure from pump P has been supplied to the bottom chamber of cylinder 22 and that therefore the downward movement of the plasticizer 20 is relatively rapid. Fluid contained in the upper chamber of cylinder 22 exhausts from the chamber through conduit 94, valve section B of valve 90 to tank.

After the nozzle has been positioned in close proximity to the bottom of the preform cavity 18, the flow of plasticized material from the nozzle 23 into the cavity 18 is initiated. As the flow of plasticized material continues, the plasticizer 20 is drawn slowly upwardly. It has been found desireable to correlate the rate of withdrawal of nozzle 23 with the flow rate of the plasticized material from nozzle 23 during most of the filling phase, such that the tip or orifice of the nozzle is maintained near (usually within an eighth of an inch for most materials) the upwardly advancing level of the charge of plasticized material being deposited in the cavity 18. Less viscous resins, such as the polyolefins, flow relatively easily from the nozzle so that the level of the charge is slightly above the tip of the nozzle during filling. The more viscous or "stiff" resins, such as the high nitrile types, flow relatively more slowly from the nozzle, and thus the tip of the nozzle is usually spaced slightly above the level of the charge. In this manner, a substantially symmetrical, void-free charge of plasticized material is reliably deposited in the cavity 18.

At this point it should be noted that very important advantages result from arrangements wherein the charge of plasticized material is placed in a cavity as heretofore described. Most important of these is that the maximum temperature to which thermoplastic materials must be raised is substantially below that necessary in injection blow molding. Because the plasticized material freely issues from the orifice of a nozzle that has a cross-sectional area at least several times larger than that of the gate in an injection mold, the viscosity of the plasticized material deposited can be relatively high; thus the viscosity of the material does not have to be lowered by raising its temperature as is necessary in injection blow molding. For example, the temperature of the high nitrile barrier resins previously mentioned, must be raised to above 410° F. and in some instances close to 450° F., to achieve flow characteristics adequate for injection molding a preform. These temperatures are very close to the temperatures at which some materials degrade. In comparision, when using these high nitrile resins in the process herein disclosed, charges are deposited in the preform cavity at temperatures in the range of 350°–380° F. By reason of the lowered temperature of the plasticized material, the risk of degrading these thermo-sensitive materials is greatly reduced. With respect to other thermoplastic resins, for example, polyethylene, polypropylene, PVC, SAN, the charge can be deposited in the cavity at temperatures very close to the ideal forming and blowing temperatures of these materials. This reduces or eliminates the need for thermal conditioning of the charge and preform, thereby reducing machine cycle time and decreasing the energy requirements of the apparatus.

It should be noted that, when the flow of plasticized material is initiated, the valve 90 is energized to position section A of this valve between the pressure and tank conduits, and lines 94 and 98.

In this mode, line pressure from conduit P is delivered through valve section A to conduit 94 and thence into the upper chamber of the cylinder 22. This causes the plasticizer 20 to rise vertically. However, it should be noted that the exhaust of fluid from the lower chamber of the cylinder 22 is controlled by a three-position solenoid valve 91. During the time that the plasticizer 20 is feeding a charge into the preform cavity 18, the valve section A of valve 91 is positioned to connect conduit 101 to conduit 99. Thus, the fluid exhausted from cylinder 22 flows through conduit 95, through conduit 101, through valve section A, through conduit 99, to a variable fluid flow restrictor 92 and thence through valve section A of valve 90 to tank. The flow restrictor 92 limits the flow rate of fluid through conduit 99 and therefore causes the cylinder 22 to rise slowly. The flow restrictor 92 is a type that is readily adjustable to yield a range of fluid flow rates through conduit 98. By means of this adjustment, the rate of rise of the nozzle 23 can be regulated in accordance with the flow rate of the plasticized material from nozzle 23, thereby maintaining the tip of the nozzle near the level of the charge being introduced into the preform cavity. It should be noted that fluid flow from the lower chamber of cylinder 22 through conduit 97 is prevented by check valve 96.

When the plasticizer 20 has finished delivering a charge of plasticized material, the valve 91 is actuated to position valve section B so that conduit 101 is in fluid communication with conduit 99. Thus, fluid exhausted from the lower chamber of cylinder 22 flows through conduit 95, through conduit 101, through valve section B of valve 91, through conduit 99, through conduit 100, through conduit 94 and through valve section A of valve 90 to tank. In this manner, the variable flow restrictor 92 is bypassed and fluid can exhaust more quickly from the bottom chamber of cylinder 22. As a result, the plasticizer 20 rises relatively quickly, drawing the nozzle 23 clear of the preform cavity 18.

MACHINE OPERATING CYCLE

Reference is made to FIGS. 8A-8M that illustrate one operating cycle of the apparatus described above.

Figure 8A:
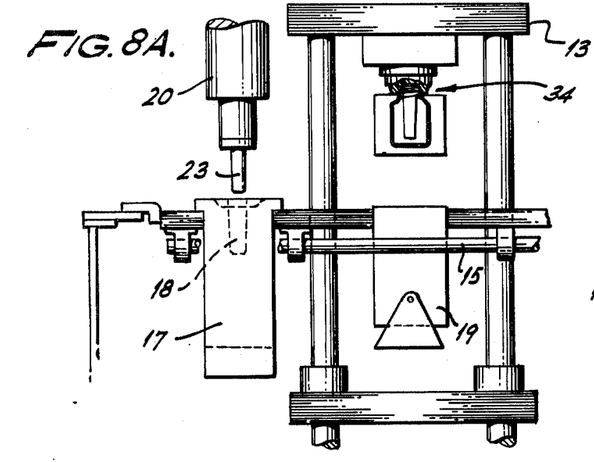
FIGS. 8A through 8M illustrate schematically the sequence of operation of apparatus of the type shown in FIG. 1.

In FIG. 8A, the apparatus is shown with the shuttle 14 positioned so that the longitudinal axis of preform cavity 18, is aligned with the longitudinal axis of nozzle 23. The receiving tube 19 is disposed beneath the core and the neck ring unit 34. It should be realized that during a normal operating cycle, a completed article is being formed and released at the forming station 13 during the sequence depicted in FIGS. 8A through 8D.

Figure 8B:
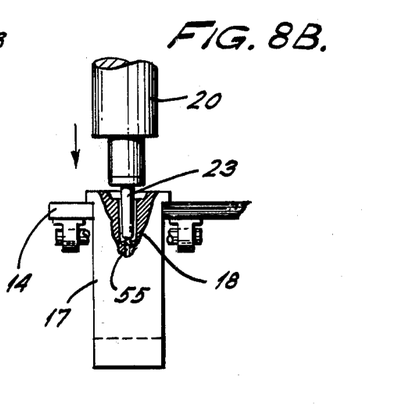

FIG. 8B is a partial view of the apparatus illustrating downward movement of the plasticizer 20 to position the tip of the nozzle 23 a short distance from the bottom of preform cavity 18. During this time, the nozzle 23 has entered the cavity 18 quickly as previously described in connection with the hydraulic control circuit of FIG. 7. After downward movement of the plasticizer 20 is terminated, plasticized material is caused to issue from the nozzle 23 and enters the recess 55 and begins filling the bottom of the preform cavity 18.

Figure 8C:
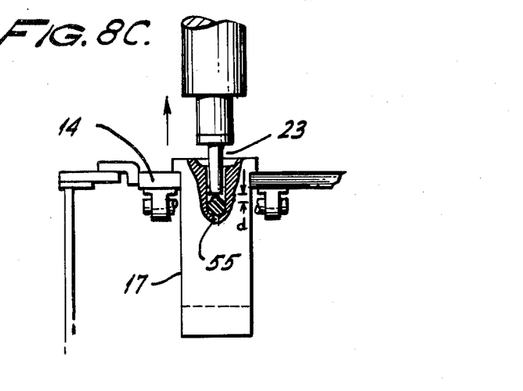

FIG. 8C shows the nozzle 23 of the plasticizer as it is being withdrawn relatively slowly as the plasticized material is deposited in the preform cavity 18. The speed of ascent of the plasticizer 20 is controlled by the variable flow restrictor 92 so that the tip of nozzle 23 is maintained near the upwardly advancing level of the charge of plasticized material, for example, a short distance d, above the level of the charge, as shown. The speed of ascent is made variable so that differences in flow rates among various resins and differences in charge volumes can be accommodated, yet the positioning of the tip of the nozzle near the level of the charge, while the charge is deposited, is maintained.

Figure 8D:
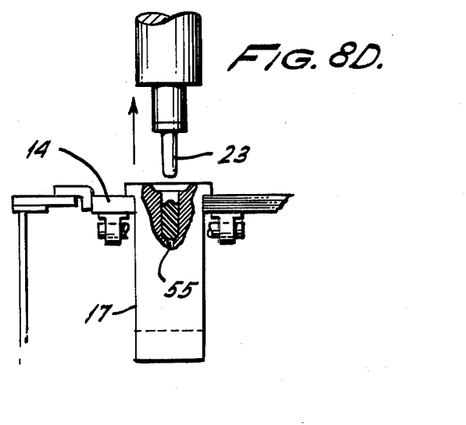

Referring to FIG. 8D, after a predetermined volume of plasticized material has been deposited in the preform cavity 18, the hydraulic control circuit shown in FIG. 7 is activated to its fast rise mode and the nozzle 23 is quickly withdrawn from the preform cavity 18. If a plasticized material that has a tendency to "string" is being used, after the nozzle 23 has been withdrawn from the preform cavity 18, the solenoid 43 (FIG. 2) is energized so that hot wire 41 is caused to sweep beneath the nozzle and sever any material extending between the charge and the nozzle 23.

It should be noted that progressively feeding the charge of plasticized material from the bottom of the preform cavity 18 upward, ensures that no air is occluded in the charge as it is deposited in the cavity. Further, a symmetrically shaped charge is evenly deposited cavity 18. Both of these features contribute to the reliable formation of the preform.

Figure 8E:
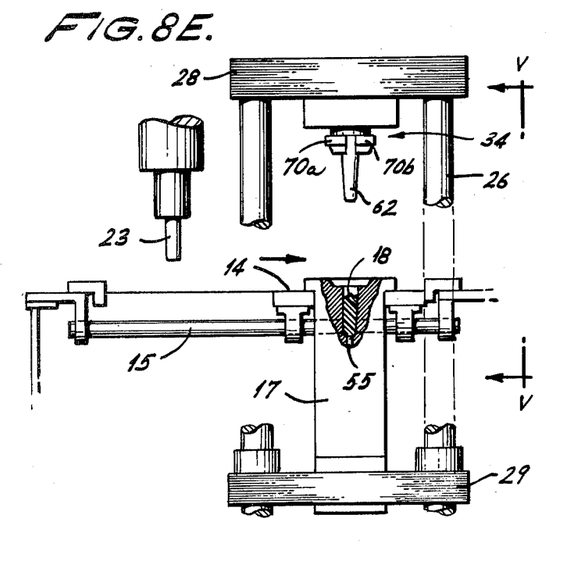

FIG. 8E shows that the shuttle 14 has moved along guides 15 to position the preform cavity 18 directly beneath the core 62. It should be realized that the receiving tube 19, that contained a finished article from the previous blow molding step, has moved from under the core 62 and has released the article, as described in connection with FIG. 6. It should also be realized that the locking block 47 attached to moveable plate 29 has entered the locking recess 48 of cavity block 17, thereby firmly coupling the cavity block 17 to the moveable plate 29. At this time, moveable plate 29 is driven upwardly, as by hydraulic cylinder 31 (FIGS. 1 and 3) thereby driving the cavity block 17 toward the core and neck ring assembly 34.

Figure 8F:
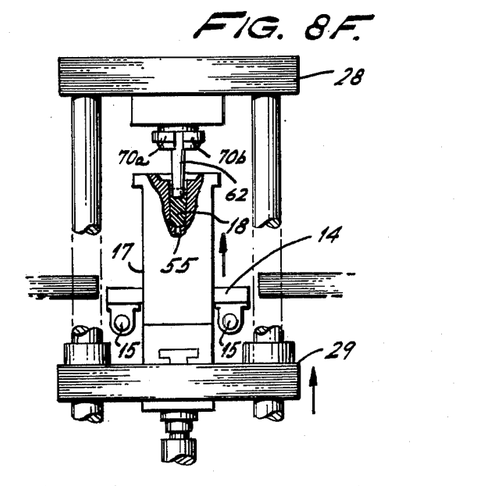

FIG. 8F is a view of the apparatus depicted in FIG. 8E looking in the direction of arrows V. In this view, the preform cavity block 17 is shown as having partially completed its upward travel, with the core 62 just entering the preform cavity 18. It should be noted that the neck ring parts 70a and 70b remain slightly open about the base of the preform core 62.

Figure 8G:
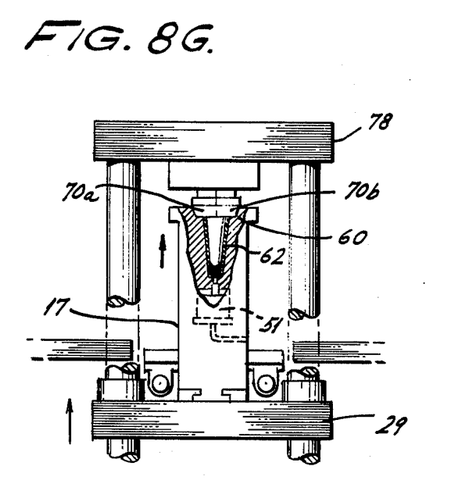

FIG. 8G is a view of the apparatus taken along the same line as FIG. 8F. In this view, the tapered surface 60 of the preform mold cavity has closed the neck ring parts 70a and 70b about the core 62 so that a closed mold space is defined in the continuous space between the core, the preform cavity 18 and the neck ring mold prior to the time that the level of the resin has reached the neck mold.

It should be noted that, up to this time, no molding pressure has been placed on the plasticized material in the preform cavity; the plasticized material has freely advanced upwardly into the annular space between the core and the preform mold cavity. The only stress induced into the plasticized material during this part of the cycle is frictional stress resulting from flow between core and cavity surfaces. Also plasticized material remains in the recess 55 in the preform mold cavity, as shown in FIG. 4.

It should further be realized that, as the core 62 advances into the charge of plasticized material, because of the absence of pressure on the plasticized material, the core is not deflected by a pressure differential occurring within the mold cavity. Rather, the hydraulic forces are equalized and the tendency for the core to deflect is eliminated.

Figure 8H:
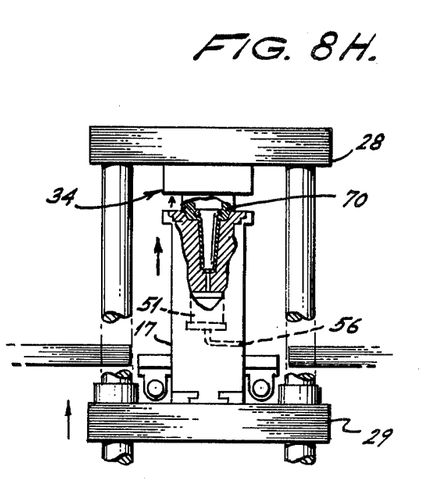

FIG. 8H shows the moveable platen 29 at its upper limit of vertical travel. At this point, the preform cavity block 17 has pushed the neck ring assembly vertically upward to its upper limit of travel as shown in the full line position of FIGS. 5A and 5B and the core is introduced to its maximum extent into the preform cavity. At this time, the plate 29 imparts a clamping force to hold the preform mold member 50 and core assembly 34 together under pressure. After this clamping force is applied, fluid under pressure is supplied via conduit 56 to the chamber beneath piston 51, which causes upward movement at piston 51, thereby causing extension or ram 54 (FIG. 4) to enter the recess 55 and force plasticized material from recess 55 into the preform mold space. The plasticized material, under pressure, completes the filling and packing of the preform mold space. The pressure that must be placed on the resin by the ram 54 varies, depending upon the material being processed. For materials such as the polyolefins, pressures of 300 psi or less have been used; for "stiff" materials such as the nitrile resins, pressures in the range of 4000-5000 psi are used. The ram 54 advances in recess 55 until the pressures on both sides of the ram, that resulting from the pressure of the material in the cavity and that derived from the pressurized fluid on piston 51, are in equilibrium. Preferably, at this point, the top surface of the ram is spaced a short distance below the bottom wall of the preform cavity. The equilibrium pressure varies, depending on the resin being processed.

An important advantage of the equipment just described is that the preform mold cavity is fully defined before the plasticized material is placed under pressure. This avoids flashing of the plasticized material, especially in the region of the neck mold. Because the final forming pressure is relatively low, the tolerances between mating preform molding tools can be significantly reduced from the tolerance levels required in injection molding tools. This latter factor substantially reduces tooling manufacturing costs. Also, because the final forming operation of the preform is carried out under low pressure, there is a reduction in undesireable pressure-induced stress concentrations in the preform.

As the foregoing steps were carried out, the charge of plasticized material and the preform were being temperature conditioned for optimum blow molding by the circulation of heat exchange fluids about the preform cavity and in the core.

Figure 8I:
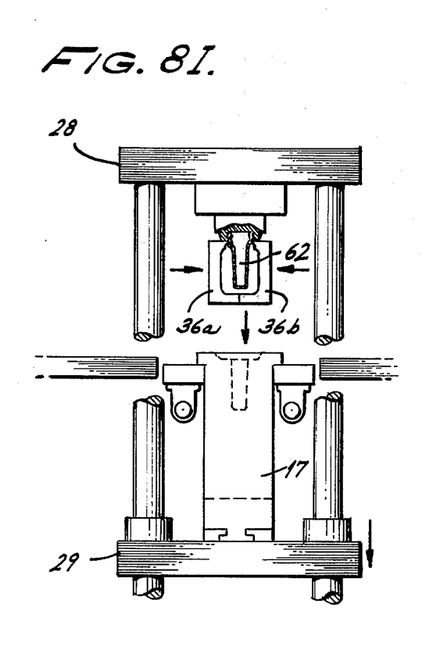

Referring to FIG. 8I, after the formation of a complete preform on the core 62, the plate 29 moves downwardly and carries with it the preform cavity block 17. Once the cavity block 17 has been lowered away from the core 62, the blow mold parts 36a and 36b are brought together about the core 62, which now carries a complete preform.

Figure 8J:
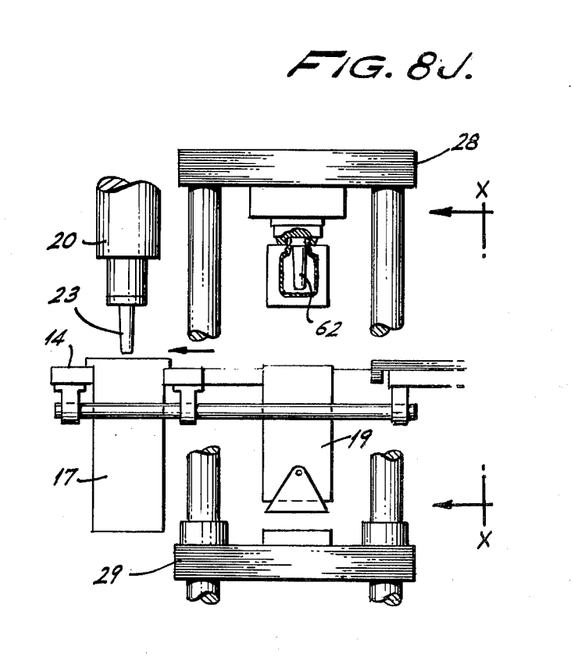

FIG. 8J shows the next step of the sequence in which the shuttle 14 has moved to position the preform cavity block 17 once again beneath the nozzle 23 of the plasticizer 20 and the receiving tube 19 beneath the core 62. While the foregoing has been carried out, blowing gas has been introduced into the core 62 and the preform is inflated against the walls of the blow cavity.

Figures 8K, 8L, 8M:
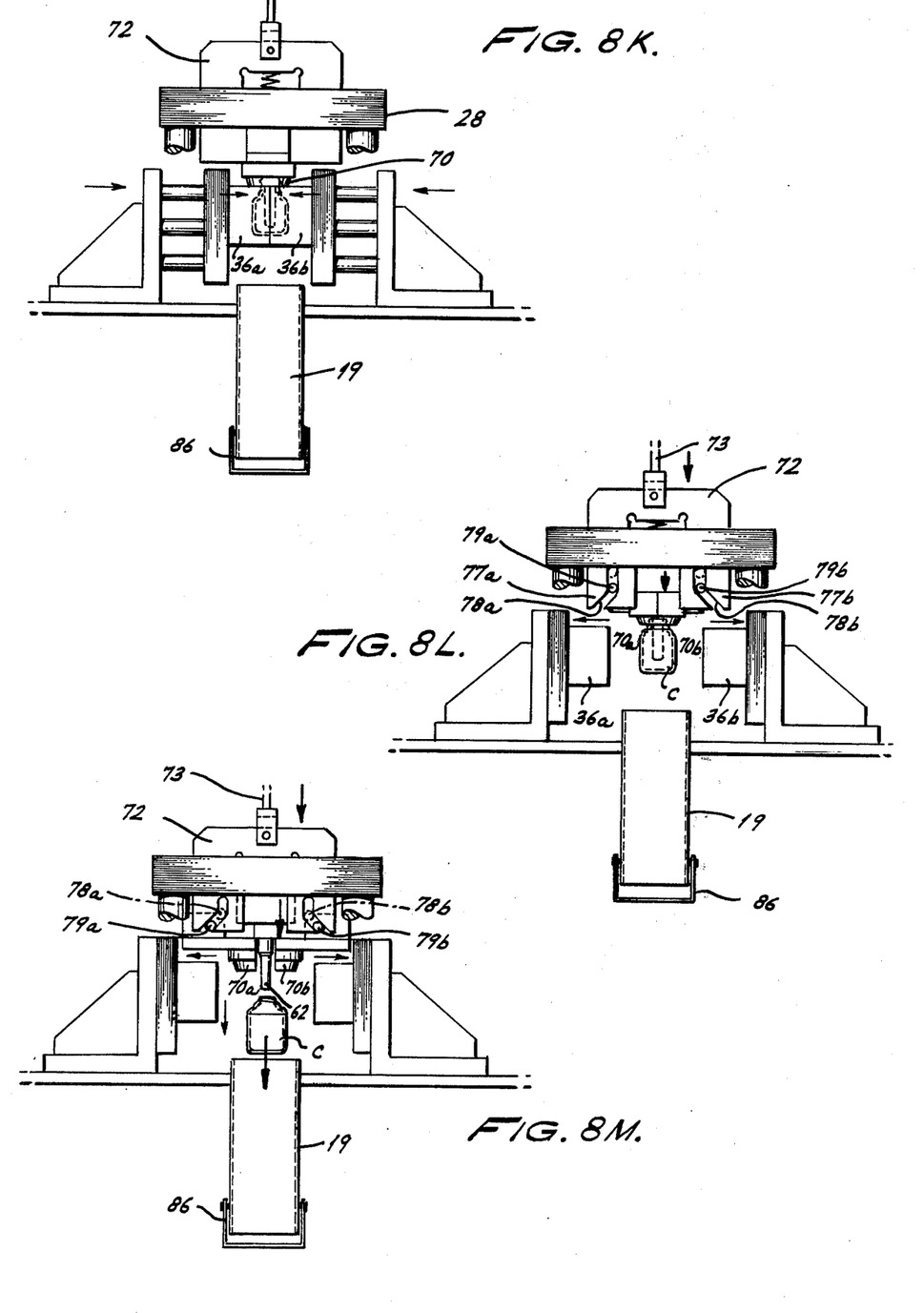

FIG. 8K is a view of the apparatus shown in FIG. 8J, the view being taken in the direction of arrows X X. This view is taken showing the position of blow cavity sections 36a and 36b about the core 62 and prior to movement of yoke 72 downwardly.

FIG. 8L, a view taken in the same direction as FIG. 8K, shows the initial movement of the yoke 72 downwardly with accompanying movment of the cam followers 79a, 79b from the starting position (shown in phantom line) downwardly in the initial portion of the cam tracks 78a, 78b. During this movement, the neck ring segments 70a, 70b remain closed about the neck of the finished container C. As the neck ring sections are moved downwardly, they carry the finished container C downwardly and move it longitudinally with respect to the core 62. This results in stripping the neck of the container C from the core 62.

FIG. 8M shows a continuation of the movement of yoke 72 and neck ring segments 70a and 70b. During this phase of operation, the cam followers 79a, 79b are moved into the outwardly diverging sections of the cam tracks 78a, 78b respectfully. This causes the neck ring segments 70a, 70b to be moved laterally outwardly with respect to the core 62, allowing the finished container C to disengage from the undercut portion of the neck ring segments and to fall by gravity into the receiving tube 19. The finished container C is retained in the tube 19 by the pivoted bottom wall 86.

In the foregoing description, the sequence of operation is controlled by a control system utilizing conventional limit switches and timers to control the initiation, duration, and termination of the various phases of operation; the design of a suitable system is believed to be within the skill of the ordinary artisan in this art.

Figure 9:
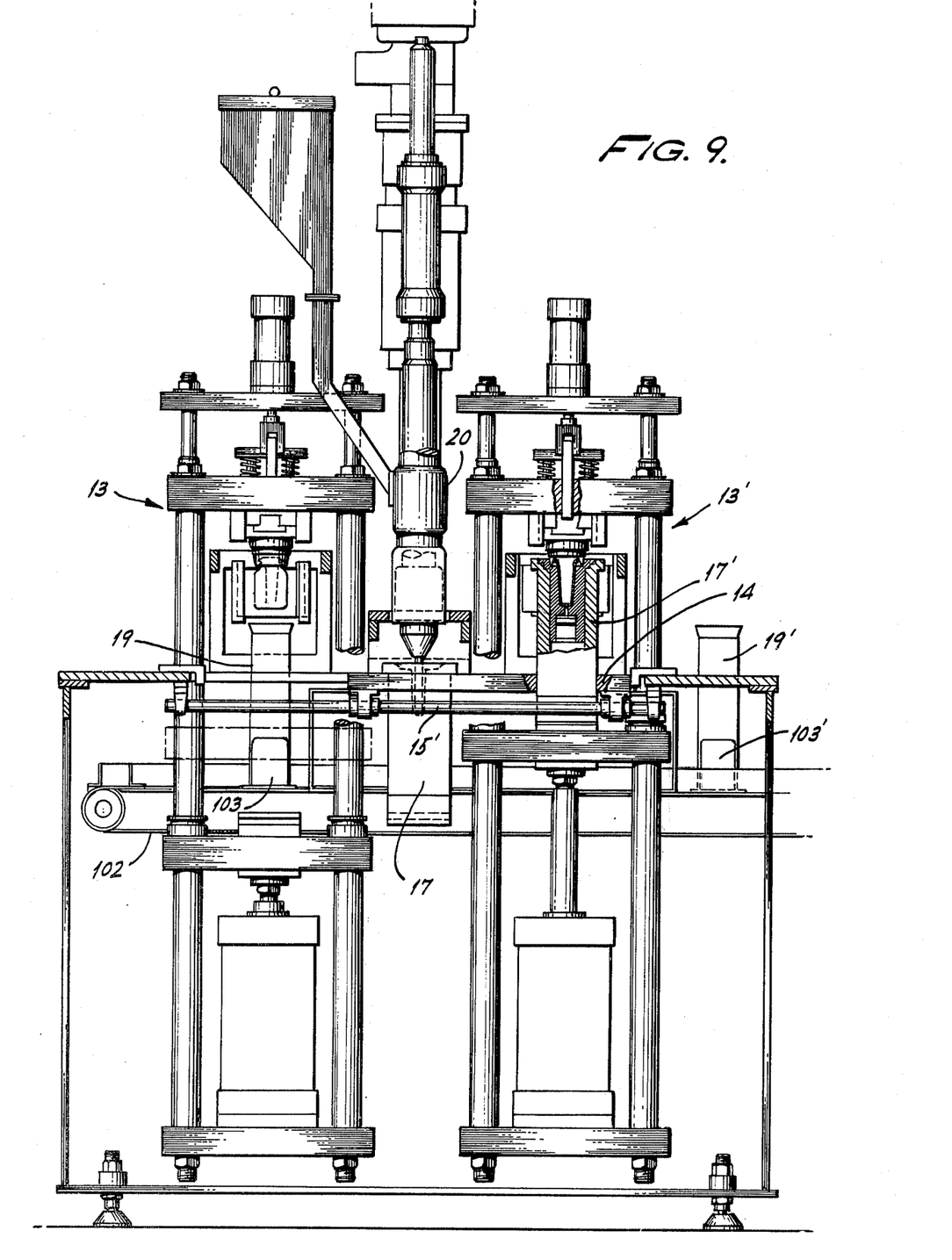
FIG. 9 illustrates a second embodiment in which a single plasticizing element serves two forming units.

DESCRIPTION OF FIG. 9 EMBODIMENT

Turning to FIG. 9, the apparatus shown therein functions essentially in the same manner as previously described with respect to the FIG. 1 embodiment. Two forming stations 13 and 13' are disposed on each side of a plasticizer 20. The forming stations are substantially as described with respect to the embodiment of FIG. 1. In this apparatus, the shuttle 14 carries two preform cavity blocks 17 and 17' and two receiving tubes 19 and 19'.

As shown in FIG. 9, the spacing between the preform cavity block 17 and 17' is such that when one of the cavity blocks is positioned to receive the nozzle 23 of the plasticizer 20, the other is positioned at a forming station in position to form a preform on a core. In this manner, while a finished container is formed at one of the forming stations, a preform can be formed on the core at the other forming station. In this design idle time of the plasticizer is reduced and output can be substantially doubled over the embodiment shown in FIG. 1.

In this embodiment, a different arrangement is utilized for removing finished containers from the apparatus. Each of the receiving tubes, 19, 19' has an opening 103, 103' at the bottom thereof. The size of the openings, 103,103' is sufficient so that a finished container can be pushed laterally out of the receiving tubes 19, 19' by a suitable ejecting element (not shown) through the openings 103, 103' onto a belt conveyor 102.

CONCLUSION

From the foregoing discussion, it can be seen that many benefits and advantages are present in the invention disclosed herein; some of which are:

The amount of material used for each container is precisely controlled, with substantially no waste occurring;

The manufacturing costs of the equipment and tooling is kept low by eliminating the requirements for developing high clamping and injection pressures;

The ease of processing thermoplastic materials is increased, the risk of temperature-induced degradation of such materials is decreased, and machine cycle times are reduced, by the deposit of a viscous, relatively low temperature charge that is at a temperature substantially lower than that necessary for injection molding of such materials;

The range of article sizes that can be economically produced by the apparatus, in relation to both machine cost and processing cost, exceeds that of other systems;

Even materials difficult to process, such as the nitrile barrier resins, can be processed directly to form finished containers, without the need for intermediate conditioning steps.

I claim:

1. A method for forming a hollow article from plasticized material comprising depositing a charge of plasticized material into a preform cavity by locating an orifice for delivery of the plasticized material near the bottom of the preform cavity, commencing the delivery of plasticized material from the delivery orifice while the orifice is near the bottom of the preform cavity, delivering plasticized material from the orifice as relative separation between the orifice and the bottom of the cavity is effected to deposit a substantially void-free, substantially symmetrical charge in the preform cavity and in receiving means in communication with the preform cavity, effecting relative withdrawal of the delivery orifice from the preform cavity, predetermining and establishing a desired distance relationship between the delivery orifice and the level of the charge of plasticized material during delivery thereof to the preform cavity, effecting relative telescopic movement of the preform cavity and a preform core to displace the charge of plasticized material in the preform cavity, thereby forming an unpacked preform on the preform core, forming a substantially closed mold space defined at least in part by the preform core and preform cavity before the charge of plasticized material is fully displaced, packing the unpacked preform by displacing plasticized material from the receiving means into the preform mold space, effecting relative separation of the preform cavity and preform core while maintaining the preform in blow-moldable condition, and thereafter blow molding the preform to form the hollow article.

2. A method for forming a hollow article from plasticized material comprising depositing a charge of plasticized material into a preform cavity by locating an orifice for delivery of the plasticized material near the bottom of the preform cavity, commencing the delivery of plasticized material from the delivery orifice while the orifice is near the bottom of the preform cavity, delivering plasticized material from the orifice as relative separation between the orifice and the bottom of the cavity is effected to deposit a substantially void-free and substantially symmetrically shaped charge in the preform cavity, predetermining and establishing a desired distance relationship between the delivery orifice and the level of the charge of plasticized material during delivery thereof to the preform cavity, effecting receipt of a quantity of plasticized material in receiving means in communication with the preform cavity, effecting relative withdrawal of the delivery orifice from the preform cavity, introducing the preform core into the preform cavity to displace the charge of plasticized material in the preform cavity and form an unpacked preform on the preform core, forming a closed preform mold space defined at least in part by the preform core and preform cavity before the charge of plasticized material is fully displaced by the core, packing the unpacked preform by displacing plasticized material from the receiving means into the preform mold space, effecting relative separation of the preform cavity and preform core while maintaining the preform in blow-moldable condition, and thereafter blow molding the preform to form the hollow article.

3. A method as in claim 2 wherein the delivery orifice feeds a portion of the charge of plasticized material into the receiving means.

4. A method as in claim 2 wherein the quantity of plasticized material received in the receiving means comprises a portion of the charge that is deposited into the preform mold cavity.

* * * * *